(12) United States Patent
McNamara et al.

(10) Patent No.: US 11,556,563 B2
(45) Date of Patent: Jan. 17, 2023

(54) DATA STREAM PROCESSING

(71) Applicant: Oracle International Corporation, Redwood Shores, CA (US)

(72) Inventors: Sean Jay McNamara, Lehi, UT (US); Ethan William Dereszynski, Oregon City, OR (US)

(73) Assignee: Oracle International Corporation, Redwood Shores, CA (US)

( * ) Notice: Subject to any disclaimer, the term of this patent is extended or adjusted under 35 U.S.C. 154(b) by 184 days.

(21) Appl. No.: 16/900,357

(22) Filed: Jun. 12, 2020

(65) Prior Publication Data
US 2021/0390119 A1 Dec. 16, 2021

(51) Int. Cl.
*G06F 16/27* (2019.01)
*G06N 20/00* (2019.01)
*G06N 5/04* (2006.01)

(52) U.S. Cl.
CPC ............ *G06F 16/278* (2019.01); *G06N 5/04* (2013.01); *G06N 20/00* (2019.01)

(58) Field of Classification Search
CPC ............ G06F 16/211; G06F 16/24568; G06F 16/278; G06F 16/221; G06F 16/24556
USPC ........................................................ 707/737
See application file for complete search history.

(56) References Cited

U.S. PATENT DOCUMENTS

| | | | |
|---|---|---|---|
| 11,366,801 B1 | 6/2022 | Kumar et al. | |
| 2014/0108817 A1 | 4/2014 | Chen et al. | |
| 2015/0026167 A1 | 1/2015 | Neels et al. | |
| 2016/0012280 A1 | 1/2016 | Ito et al. | |
| 2016/0042015 A1 | 2/2016 | Landau et al. | |
| 2017/0006135 A1* | 1/2017 | Siebel | H04L 67/12 |
| 2017/0039242 A1 | 2/2017 | Milton et al. | |
| 2020/0012647 A1* | 1/2020 | Johnson, III | G06F 16/24556 |
| 2020/0202127 A1* | 6/2020 | Chen | G06Q 50/02 |
| 2022/0058732 A1 | 2/2022 | Reses | |

OTHER PUBLICATIONS

Armbrust Michael Michael@Databricks Com et al., "Spark SQL Relational Data Processing in Spark," Proceedings of the 2015 ACM SIGMOD International Conference on Management of Data, SIGMOD '15, ACM Press, New York, New York, USA, May 27, 2015, pp. 1383-1394.

* cited by examiner

*Primary Examiner* — Hung T Vy
(74) *Attorney, Agent, or Firm* — Invoke

(57) ABSTRACT

Techniques for partitioning data from a data stream into batches and inferring schema for individual batches based on the field values of each batch are disclosed. The system may infer different schemas corresponding to different batches of data records even though the batches are received from a common data stream or a common data source. The system may infer a schema by determining whether a field contains single values or multiple values. Then the system determines the field type(s) associated with the values. These determinations are then stored in a dictionary generated for each batch.

28 Claims, 6 Drawing Sheets

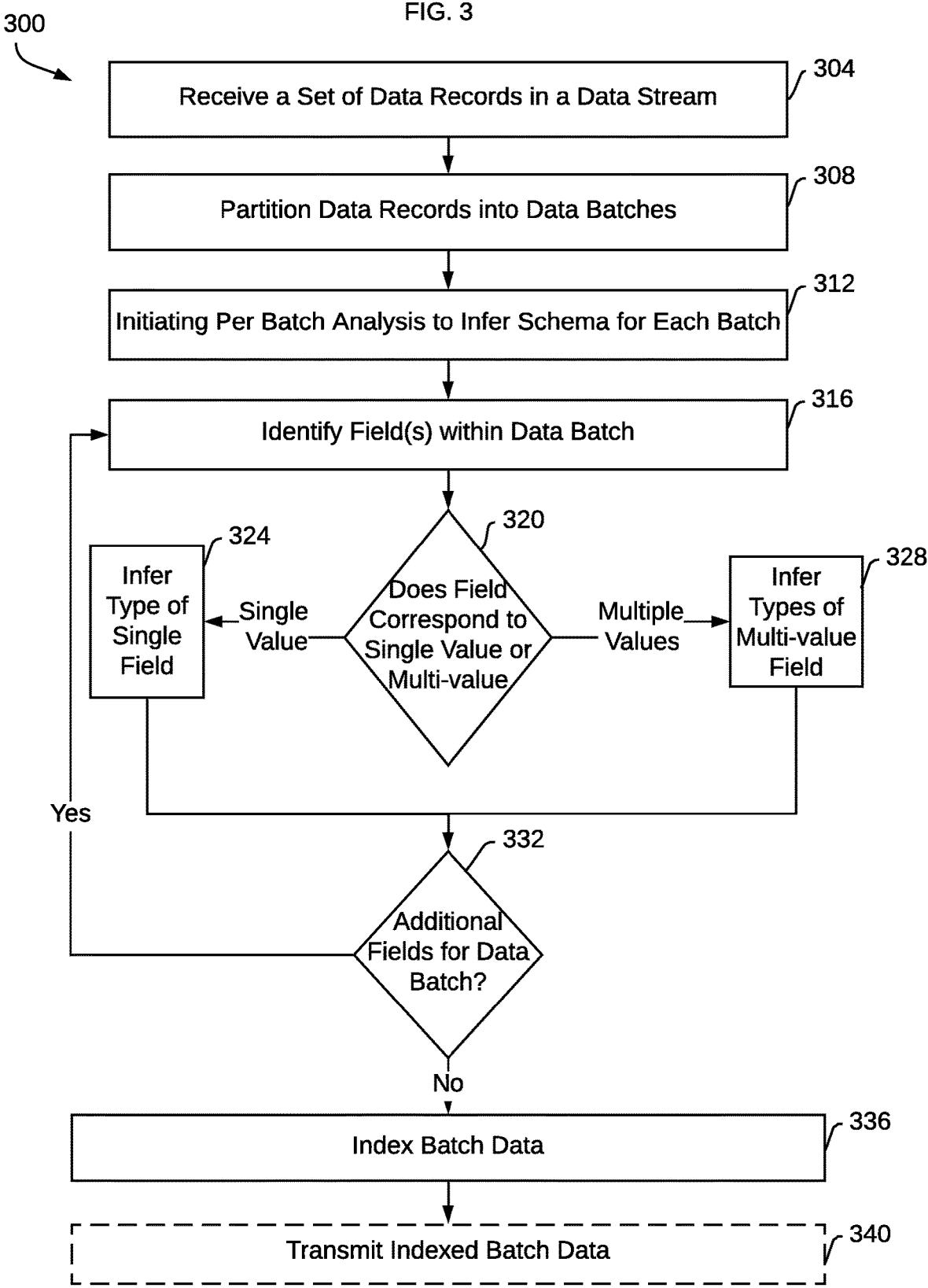

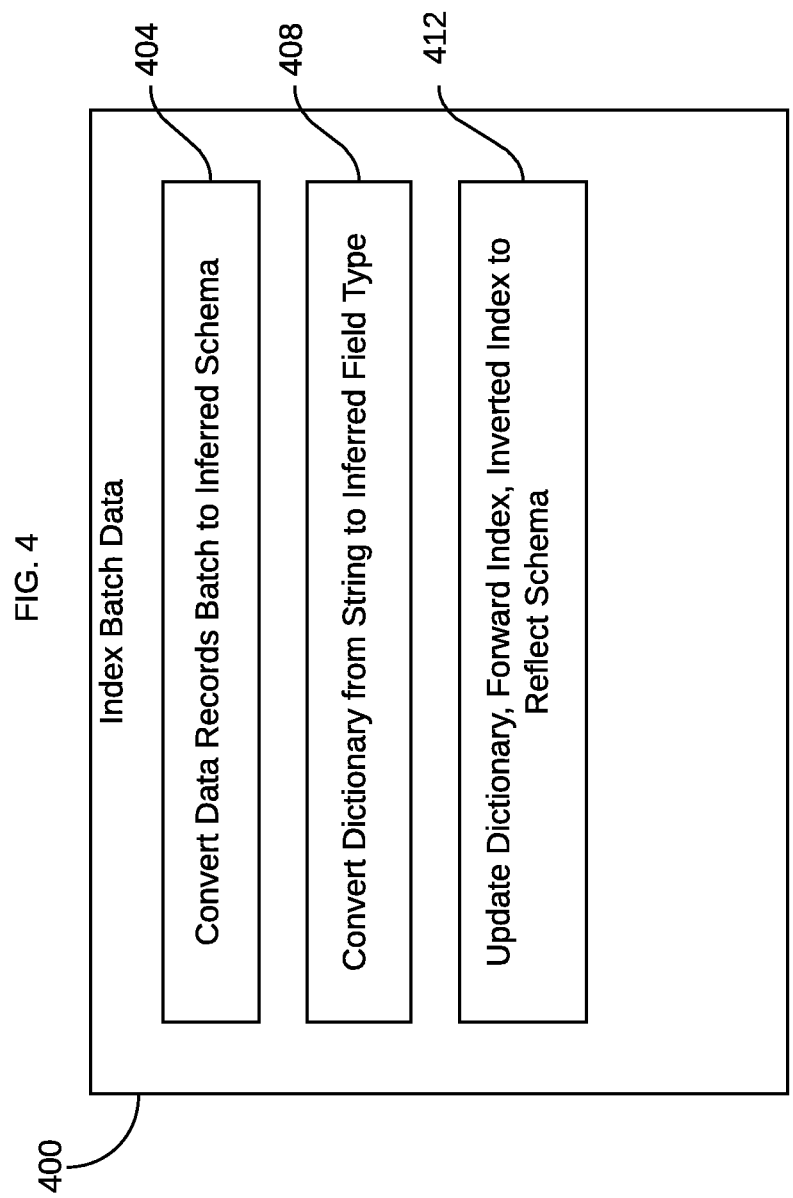

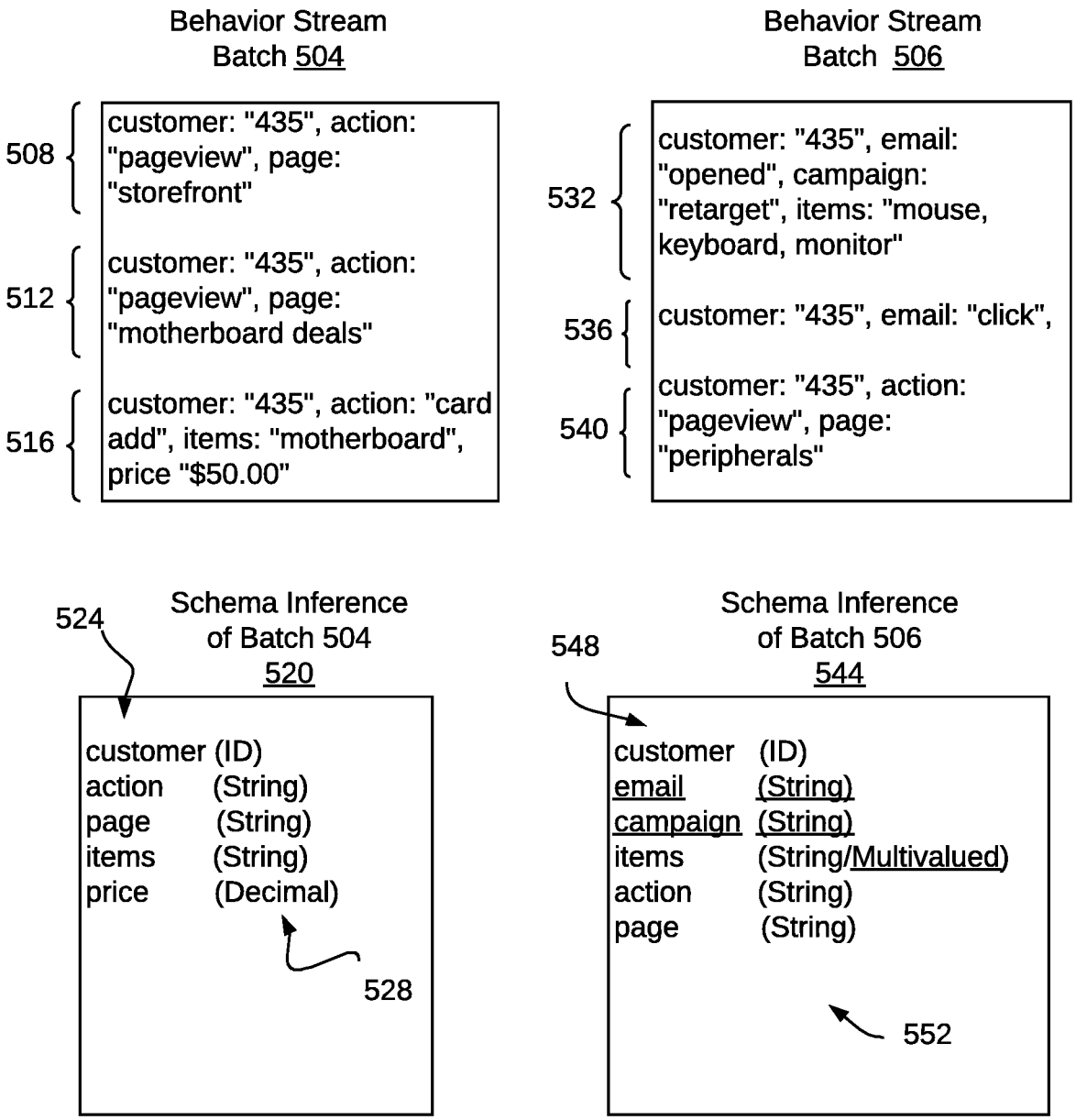

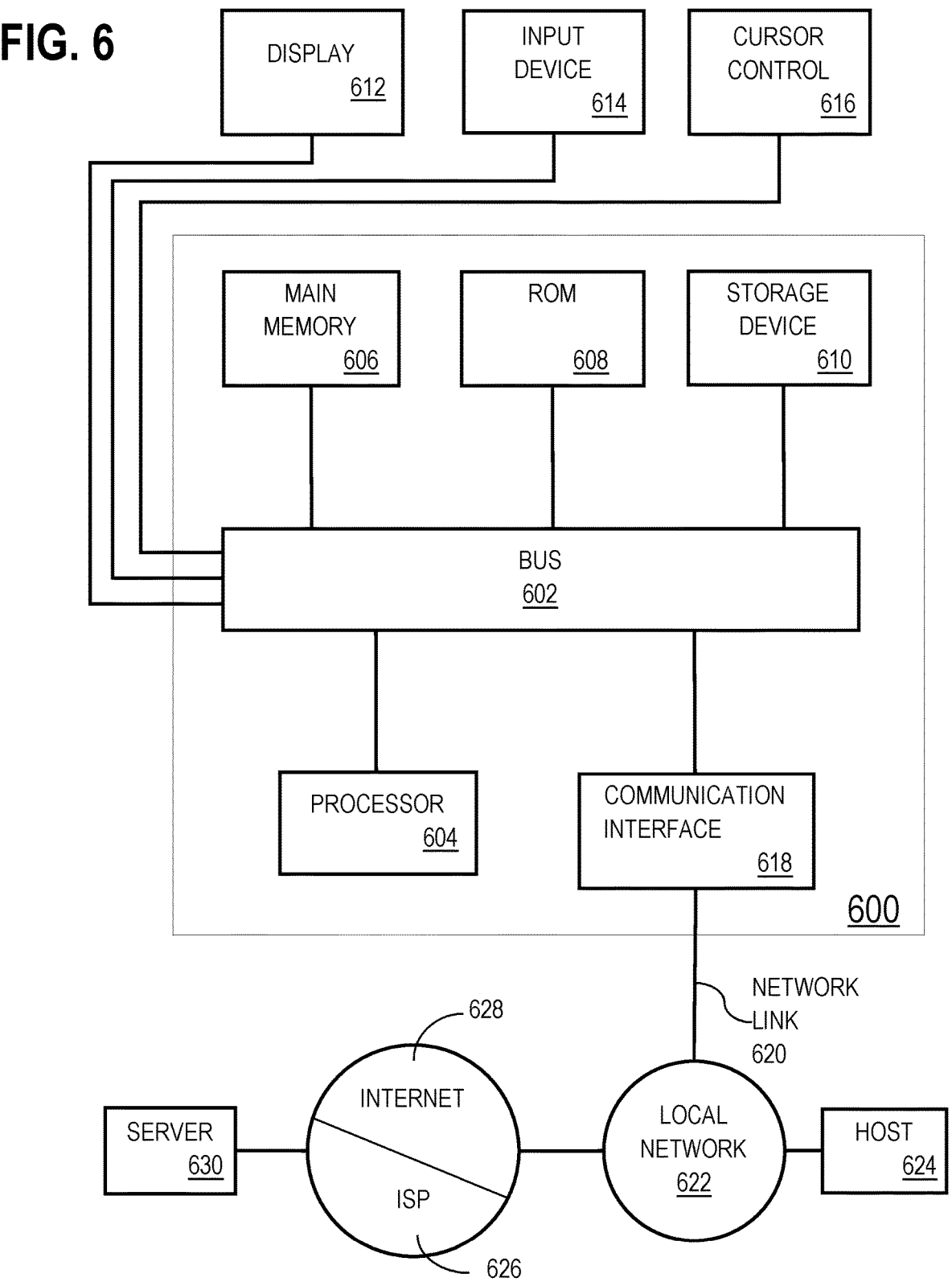

DATA STREAM PROCESSING

TECHNICAL FIELD

The present disclosure relates to processing data in a data stream. In particular, the present disclosure relates to per-batch analysis of data records received in the data stream to generate data storage schemas on a per-batch basis.

BACKGROUND

Data storage systems generally store data in a data structures according to a pre-defined schema. The pre-defined schema defines parameters, parameter types, and value types instantiated by the data structures. Data received by a data storage system generally must be compatible with the database schema so that the data may be stored in the established structures of the database.

Using databases that store data in a single configuration of schema can be challenging when applied to, for example, data streams with dozens, hundreds, or thousands of parameter/value pairs (sometimes colloquially referred to as "big data") either when storing or when querying the data. Also, storing data in databases that use a single schema may also present challenges in the context of multi-tenant storage environments. For example, the various tenants may not all collect data or define parameter types in the same way, nor necessarily collect data in a format that is consistent with the database schema. This may cause inconvenience to tenants of the system by requiring tenants to adapt their data collection and data object definitions to match the database schema. Variability between tenant data and the database schema may also cause errors in data storage when data received from tenants is structured in a way that is inconsistent with the database schema.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3 illustrates an example set of operations for processing a data stream, which may include identifying fields and inferring field types within the data on a batch by batch basis in accordance with one or more embodiments;

FIG. 4 illustrates an example set of operations for a batch indexing process in accordance with one or more embodiments;

FIG. 5 illustrates one example embodiment of different schemas inferred for data received from a common source, each of which includes different parameter value pairs in accordance with one embodiment; and FIG. 6 shows a block diagram that illustrates a computer system in accordance with one or more embodiments.

DETAILED DESCRIPTION

Figure 1:
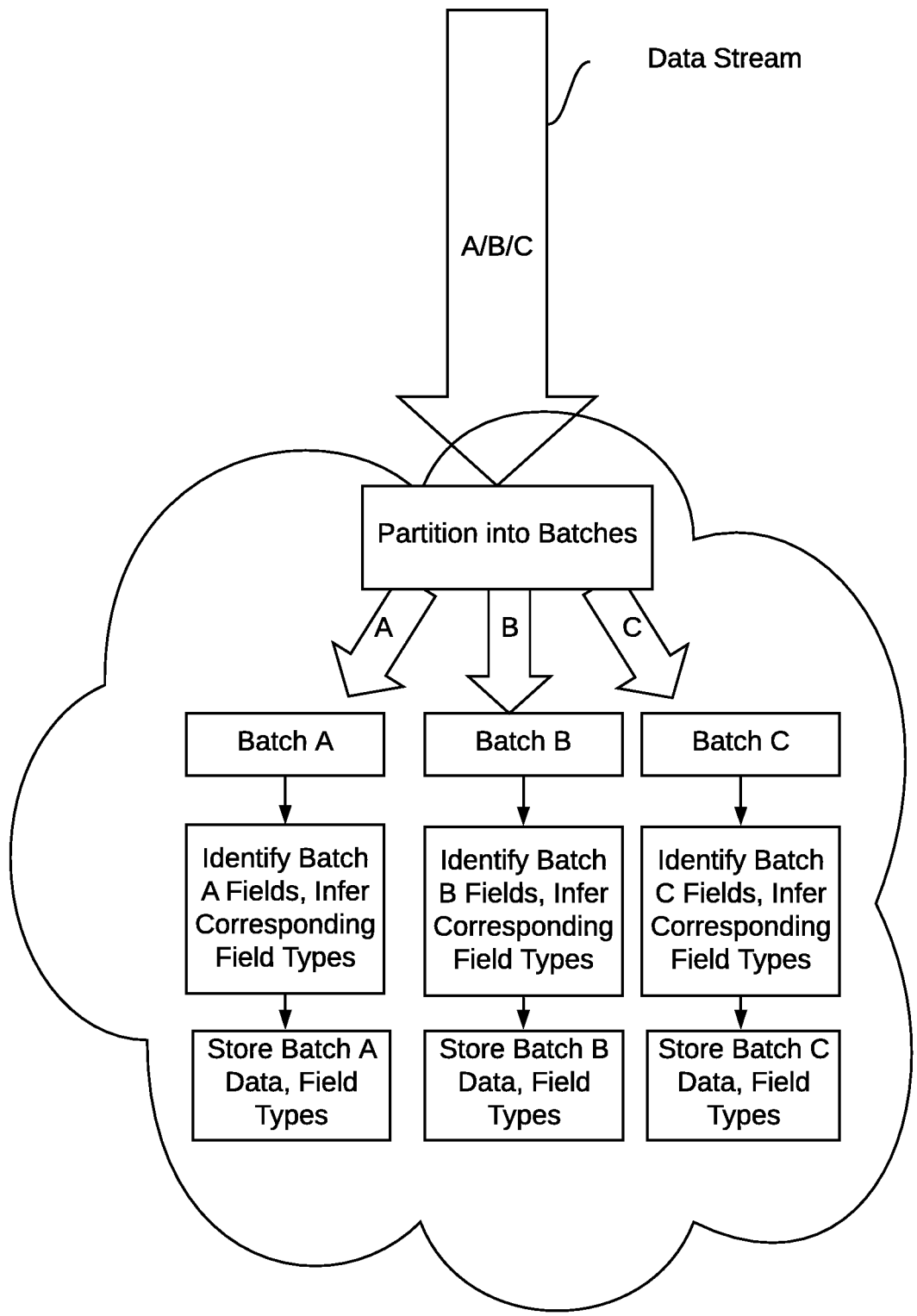
FIG. 1 is a schematic illustration of processing a data stream into batches, inferring field types and parameter values based on the data batches themselves, and storing the processed data associated with each batch according to its own inferred schema in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DATA STREAM PROCESSING
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments described herein include partitioning data from a data stream into batches and inferring schema for individual batches based on the field values of each batch. The system may infer different schemas corresponding to different batches of data records even though the batches are received from a common data stream or a common data source. In an example, a system may analyze a first batch of data records to infer a first set of one or more field types (sometimes equivalently referred to as "parameter types") for a corresponding first set of one or more parameters. The system may then analyze a different, second batch of data records and infer a second set of one or more field types for a corresponding second set of one or more parameters. In one example, a particular field (also referred to herein as a "parameter") may be associated with a single value/single type based on a first batch of data records and multiple values/multiple types based on a second set of data records. In another example, the first set of parameters and the second set of parameters need not be the same even though the first batch of data records and the second batch of data records were received from a same data stream or even received from a common data source.

While embodiments described herein may be applied to any of a variety of data streams and data records, some specific examples will be presented in the context of user behaviors on a website. Data records store user behaviors on a website (e.g., the sequence of pages visited, products browsed, page objects engaged, or other similar user-site interactions) during a user session. A session may be defined as a pre-determined period of time or a period of activity that is terminated upon a period of inactivity or a terminating event (such as a logout).

These techniques enable a number of technological advantages. For example, because field types are inferred and the data are indexed as the data are received, systems implementing the techniques described herein may process and store data in real time. Because these techniques also do not compel compliance with a pre-determined schema, the systems and methods herein improve the convenience, storage efficiency, and query speed in many types of data storage systems. A further advantage of these techniques when applied on a batch by batch basis is that the fields and field types may change between batches even for data received from a same stream or from a same data source. This may further improve storage and query efficiency while also preserving data that might otherwise be lost upon enforcing a schema, thus also improving the accuracy of stored data.

One or more embodiments described in this Specification and/or recited in the claims may not be included in this General Overview section.

2.0 System Architecture

FIG. 1 is a schematic illustration of one embodiment of the techniques described herein. As illustrated, the system (in this example, a cloud-based multi-tenant storage system) may receive a data stream. In this example, the data stream is composed of three separate sub-streams, "A," "B," and "C," each of which is generated by a separate data source (i.e., different accounts subscribing to a data processing system of the present disclosure). Each of these sub-streams may have distinct data and distinctly formatted data records, which may be different from one another. The system partitions the sub-streams according to sub-stream A, B, or C, thereby grouping same sub-stream records together as they arrive. The system stores data records from each sub-stream in corresponding batches. The data records corresponding to each batch are then analyzed using techniques described below to identify fields and corresponding field types associated with the data records. The system may index values in association with the identified fields and the inferred field types for each batch.

This process may be repeated to generate and analyze successive batches for each sub-stream. For example, the system may perform the operations described herein on a first Batch A1 of sub-stream A and then repeat the process on a second Batch A2 of the sub-stream A. The operations performed on the second Batch A2 may infer field types that are different from those inferred for the Batch A1 even though the first and second Batches A originate from the same sub-stream A (i.e., the same data source). In this way, the systems and methods described herein are able to analyze data that reflects differences in data records of different batches.

Figure 2:
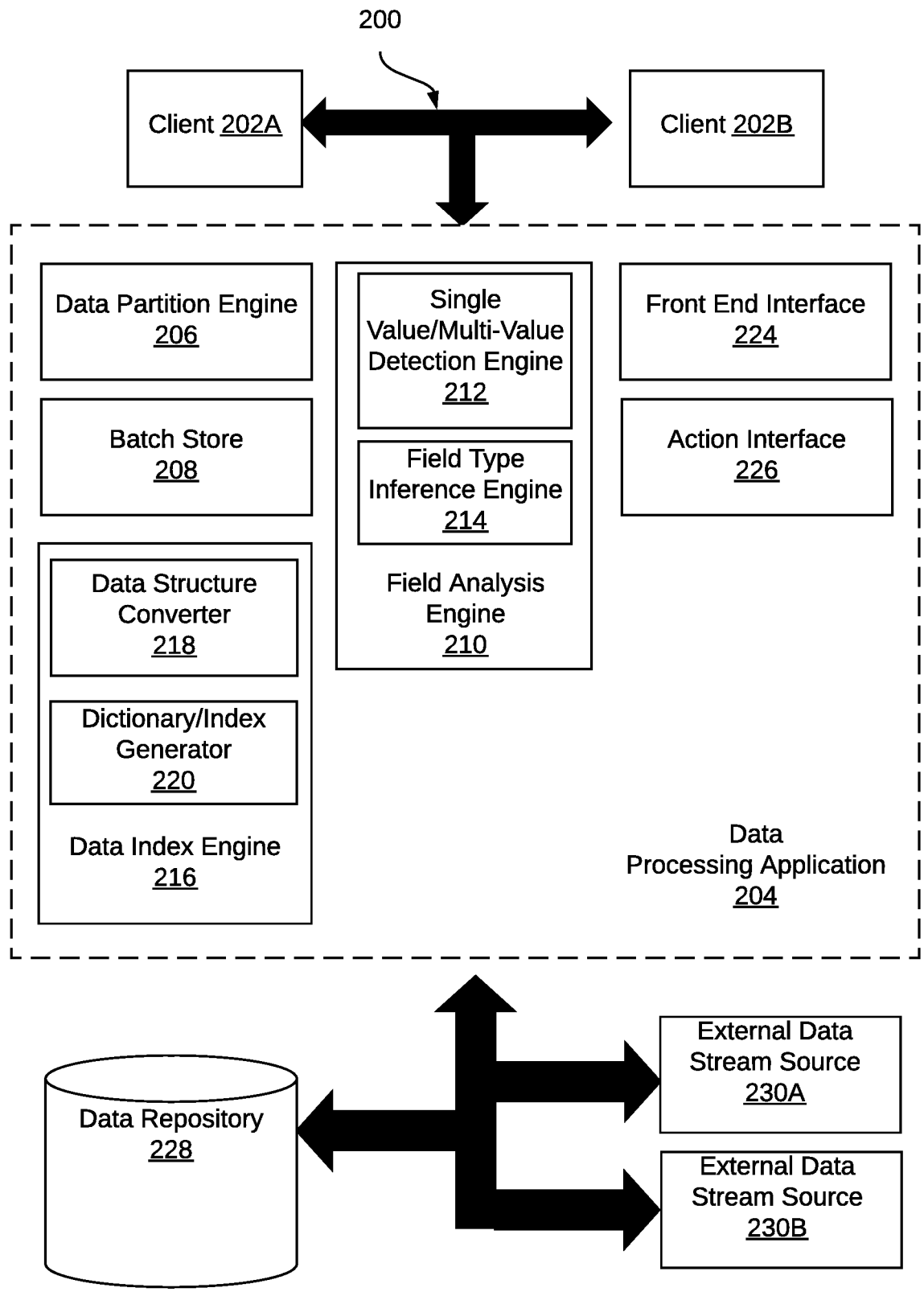
FIG. 2 illustrates a system for generating data batches from a data stream and inferring a schema corresponding to each batch in accordance with one or more embodiments.

FIG. 2 illustrates a system 200 in accordance with one or more embodiments. As illustrated in FIG. 2, system 200 includes clients 202A, 202B, a data processing application 204, a data repository 228, and external data stream sources 230A, 230B. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In some embodiments, the data processing application 204 provides components that may partition an incoming data stream into batches, analyze the batches to infer value types (i.e. single value or multiple values) and infer field types (e.g., integer, string, ID). The data processing application 204 may convert the data records associated with each batch into a data structure corresponding to the inferred value and field types (also referred to as converting to an "inferred schema").

In one or more embodiments, the data processing application 204 refers to hardware and/or software configured to perform operations described herein. Examples of operations for inferring schemas of inbound data streams (among other functions) are described below with reference to FIG. 3.

In an embodiment, data processing application 204 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, the data processing application 204 is a cloud service, such as a software-as-a-service (SaaS) or a web service. Clients, such as clients 202A, 202B, may interact with the data processing application 204. Examples of clients 202A, 202B, may include a web browser, mobile application, or other software application communicatively coupled to a network. A client may interact with cloud services using one or more communication protocols, such as HTTP and/or other communication protocols of the Internet Protocol (IP) suite. In other embodiments, the data processing application 204 may be locally accessible to a user, such as a desktop or other standalone application.

Example components of the data processing application 204 include a data partition engine 206, a batch store 208, a field analysis engine 210, a data index engine 216, a front end interface 224, and an action interface 226.

The data partition engine 206 receives a stream of data and executes one or more partitioning operations on the stream. In some examples, the data stream is a stream of values that represent user actions on a website. For example, a stream of data that includes values representing a user identifier, a website identifier, identifiers of pages within the website visited by the user, actions taken (i.e., clicks) on the pages, times, dates, among other information can be received by the data partition engine 206 as one or more data records. Other types of data may also be transmitted to and processed by the system 200.

The data partition engine 206 may execute one or more partitions so as to divide and/or sub-divide an incoming data stream into multiple batches and/or sub-batches. In one example, the data partition engine 206 may partition the data stream by identifying values in data records which can be used to group related records together into batches. This may include partitioning records according to a website owner (e.g., an "account") identifier, or other similar criteria.

Incoming data records associated with a batch are stored in a temporary memory structure (e.g., a cache or other volatile memory structure) associated with the data partition engine 206. Upon identification of the partition criteria, the data partition engine passes a data record to the batch store 208.

The batch store 208 is a memory structure that stores a number of partitioned data records as a batch. That is, data records partitioned by the data partition engine 206 may be stored at a memory address (e.g., in block addresses of the memory structure) of the batch store 208 so that the batch may be analyzed by other elements of the data processing application 204. In some examples, the batch store 208 may be flash memory or another type of solid state memory (e.g., SRAM, DRAM, magnetic memory, optical memory) that has sufficient capacity to store a desired number of data records. The batch store 208 may be configured to store multiple batches, each of which may be associated with a particular data source and stored within an address block or other assigned range of addresses within a memory structure. In this way, data from multiple different sources may be accumulated into corresponding separate batches in preparation for inferring a schema for each batch.

In some examples, the batch store 208 is configured to store a number of data records selected for an efficient execution of analysis operations by other components of the data processing application 204. For example, a batch size (and therefore a memory configuration of the batch store 208) may be selected for optimized operation of the machine learning analysis engine 210 or a subsequent query of the analyzed data. For example, the batch data store 208 may be configured to store data records in a first batch until a data record capacity threshold of the first batch is met. This threshold may have a permitted range of variability to prevent a user session from being terminated mid-session. In one example, the batch data store 208 may be configured to store data records corresponding to several hundred thousand user sessions. In other examples, a batch is collected until a transition in value type(s) or field type(s) is detected within the stored data records of the batch. For example, a first batch from a particular stream may be associated with a first set of field types. A second batch from the particular stream may be started upon the system detecting that the field types have changed mid-stream to a second set of field types different from the first set.

The field analysis engine 210 may include one or more trained machine learning models or other analytical algorithms that analyze fields of data records in a stored batch to infer value types (e.g., single value or multi-value) and field types associated with the data records. In the example shown in FIG. 2, the field analysis engine 210 is illustrated as having two components.

The single value/multi-value detection engine 212 determines whether values in the data records in a batch correspond to a single value or multiple values. For example, the single value/multi-value detection engine 212 may detect the presence of characters, such as commas, semicolons, and/or quotation marks, that may be used to separate values from one another in a multiple value field. In one example, the single value/multi-value detection engine 212 may determine the value type using regular expression (REGEX) analysis techniques. In another example, the single value/multi-value detection engine 212 may determine the value type using a trained machine learning model.

The field type inference engine 214 of the field analysis engine 210 may use a trained machine learning model to determine the field type associated with a value within a given batch. In one example, the field type inference engine 214 may include a naïve Bayes classifier trained to determine a field type associated with a particular value (or field types associated with multiple values in a multi-valued field). Example field types may include string, date/time, integer, decimal, among others. For example, upon training the field type inference engine 214 with various observations of known field types, the field type inference engine 214 may be applied to a batch of data to determine the field types associated with the various values of the batch.

The data index engine 216 includes a data structure converter 218 and a dictionary/index generator 220. These components of the data index engine 216 execute functions that may reorient or reformat received values of a batch. The data index engine 216 also executes functions to generate data structures that summarize and/or characterize data within a batch. These data structures may enable and/or improve the efficiency of various operations and analyses that may be performed on the various batches.

The data structure converter 218 of the data index engine 216 may reformat data records of a batch to improve the convenience of analysis and/or querying of the data batch. For example, in some embodiments the system receives a data stream in which data is organized in a "row" configuration. In an embodiment of this example, field values associated with each user session are arranged in corresponding rows. Queries for a particular field value across multiple user sessions in this row configuration generally will access each row to identify the queried field value for each user session. This involves the consumption of many field values other than the queried field. To overcome this computationally inefficient approach, the data structure converter 218 may reformat data structures from a row orientation to a columnar orientation by organizing the parameters as a column and corresponding values for each parameter in a corresponding row. In this way, all of the values corresponding to each parameter may be accessed efficiently. This requires significantly less time and significantly fewer computational resources than accessing many field values incidental to the field of interest as is often required for row oriented data structures. Column orientation also improves the storage efficiency by reducing the presence of redundant data. For example, some field values may not change significantly over the course of a sessions (e.g., device type). These "static" parameter values may be encoded in an efficient way so that the same parameter value is not repeatedly (and redundantly) stored.

The dictionary/index generator 220 generates a dictionary of all values corresponding to the fields in the data records for each batch. The dictionary/index generator 220 accomplishes this by identifying the values that each parameter has taken within a batch and storing them in a separate dictionary data structure. The dictionary/index generator 220 generates a forward index and computes a frequency of occurrences of each value for each parameter. The index generator also generates an inverted index that maps each dictionary value to ordinal positions in the forward index. The dictionary/index generator 220 stores the dictionary, the forward index, and the inverted index in corresponding memory structures.

Front end interface 224 manages interactions between the data processing application 204 and clients 202A, 202B. For example, a client may submit requests to perform various functions and view results through the front end interface 224. A client in this context may be a computing device operated by a human user, such as a system administrator, marketing planning, or data specialist. In another context, the clients 202A, 202B may be another application, such as a shell or client application.

In some embodiments, front end interface 224 is a presentation tier in a multitier application. Front end interface 224 may process requests received from clients, such as clients 202A, 202B, and translate results from other application tiers into a format that may be understood or processed by the clients. Front end interface 224 may be configured to render user interface elements and receive input via user interface elements. For example, front end interface 224 may generate webpages and/or other graphical user interface (GUI) objects. Client applications, such as web browsers, may access and render interactive displays in accordance with protocols of the internet protocol (IP) suite. Additionally, or alternatively, front end interface 224 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of front end interface 224 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, front end interface 224 is specified in one or more other languages, such as Java, C, or C++.

In some embodiments, action interface 226 provides an interface for executing actions using computing resources, such as external resources 230A, 230B. Action interface 226 may include an API, CLI, or other interface for invoking functions to execute actions. One or more of these functions may be provided through cloud services or other applications, which may be external to the data processing application 204. For example, one or more components of system 200 may invoke an API of a client application that records user behaviors on a website and transmits those behaviors as a data stream to the data processing application 204. This is only one example, and in other examples the actions that are performed may vary from implementation to implementation.

In some embodiments, actions may be automatically triggered based on outputs received from data processing application 204. For example, action interface 226 may trigger a transfer of a batch that has been analyzed according to the techniques herein from the batch store 208 to the data repository 228. In another example, the action interface 226 may trigger operation of the data index engine 216 and the field analysis engine 210 upon the "completion" of a batch (i.e., a number of data records meeting a threshold for a full batch). Additionally, or alternatively, actions may be triggered responsive to client requests received through front end interface 224.

In some embodiments, data repository 228 stores data generated and/or otherwise accessed by components of data processing application 204. Example data may include, but is not limited to, trained ML models, batches of data that completed processing by the data processing application 204, batch dictionaries and indices, metadata related to processed data batches, and/or stored queries.

Data repository 228 may be any type of storage unit and/or device (e.g., a file system, database, collection of tables, or any other storage mechanism) for storing data. Further, data repository 228 may include multiple different storage units and/or devices. The multiple different storage units and/or devices may or may not be of the same type or located at the same physical site. Further, data repository 228 may be implemented or may execute on the same computing system as one or more other components of system 200. Alternatively, or additionally, data repository 228 may be implemented or executed on a computing system separate from one or more other components of system 200. Data repository 228 may be communicatively coupled to one or more components illustrated in system 200 via a direct connection or via a network.

In some embodiments, external resources 230A, 230B are network services that are external to data processing application 204. Example cloud services may include, but are not limited to, enterprise websites, social media platforms, email services, short messaging services, enterprise management systems, and/or cloud applications. Action interface 226 may serve as an API endpoint for invoking a cloud service. For example, action interface 226 may generate outbound requests that conform to protocols ingestible by external resources 230A, 230B. Action interface 226 may process and translate inbound requests to allow for further processing by other components of data processing application 204. Action interface 226 may store, negotiate, and/or otherwise manage authentication information for accessing external resources 230A, 230B. Example authentication information may include, but is not limited to, digital certificates, cryptographic keys, usernames, and passwords. Action interface 226 may include authentication information in the requests to invoke functions provided through external resources 230A, 230B.

Additional embodiments and/or examples relating to computer networks and microservice applications are described below in Section 5.0, titled "Computer Networks and Cloud Networks" and Section 6.0, titled "Microservice Applications".

3.0 Data Stream Processing

FIG. 3 illustrates an example set of operations for inferring a data schema for a batch of data in accordance with one or more embodiments. One or more operations illustrated in FIG. 3 may be modified, rearranged, or omitted. Accordingly, the particular sequence of operations illustrated in FIG. 3 should not be construed as limiting the scope of one or more embodiments.

The method 300 shown in FIG. 3 begins by receiving a set of data records in a data stream (operation 304). The data stream encompasses any communication of data records that may be operated on by the operations illustrated in the method 300. In one example, the data stream may be an "unbound" data stream that is not necessarily terminated by a defined terminating event.

One example of an unbound data stream includes a stream of data records storing actions taken on an interactive data resource. Data records received via a data stream may include field (alternatively "parameter")/value pairs. Unlike traditional systems that enforce a fixed set of parameters, parameter types, and value types, the data records of the present disclosure are not strictly regulated. Rather, parameters and values can be any of a variety of types.

A data record received via the data stream may, in one example, be associated with a session for a user. In some examples, a session defines a window of time during which a user has interacted with a website or other interactive computing resource. A session may be described as a period of activity between periods of inactivity, a period of time from an initiating activity (e.g., a login) to a terminating activity (e.g., a logout), or simply a defined period of active time. Upon the window of time expiring (or upon a threshold period of inactivity being exceeded), a data record for a particular user may be "closed" and transmitted to the system via the data stream. Activity by the same user after transmission of the record may be stored in a separate record.

In one example, a data record may store user behaviors performed during the session. Examples of user behaviors include interactions between the user and active elements of the computing resource such as "clicks" or mousing over interactive elements. In the embodiment of webpage interactions, data records may also indicate the website and/or webpages traversed by the user, an identity of a website owner, a user identifier (e.g., a visitor identifier unique to that user and/or user-session), a date and a time associated with the user actions, the actions taken (e.g., items browsed, items selected, items placed in shopping cart), and/or other user behaviors.

Data associated with a user session that is different from user behavior data may also be included within a corresponding data record. For example, "referral" data characterizing the path taken by a user to a particular website may be included within a data record of a session. Examples of "referral" data may include an indication of the path taken by the user to the data resource. For example, a user may access a data resource (e.g., a website) via an advertising campaign link, a third-party advertisement or promotion, a web browser search or other direct access (e.g., engaging a book mark), or engaging a link provided by the website owner itself (e.g., a link embedded in a direct marking email or prior purchase confirmation email). Field/value pairs for one or more of these referral paths may be included in a data record for a user session. In another example, "context" data may also be stored in a data record. For example, page titles, page content, user geolocation, marketing campaign identifiers related to products on browsed pages, and other information may be stored in a data record.

In examples in which the system interacts with an unbound data stream, the received data records are partitioned into a data batch (operation 308). In one example, a data batch is a set of data records where the number of records meets a threshold or a number of records that is between upper and lower thresholds. In some examples, a size (i.e., a number of records in a batch) may be selected to optimize one or more operations of the system. For example, a number of data records that constitute a data batch may be selected to optimize transfer of the batch to a different storage structure or optimize query operations.

In some examples data records may be partitioned into one or more batches based on an account identifier corresponding to an owner or administrator of an interactive data resource (e.g., an account identifier for an entity administering a website). For example, the system may inspect incoming data records for an identifier (e.g., an account identifier) in a field of a data record or in a header of a data packet. The system may group data records having a common identifier into corresponding batches. This process may continue until the number of data records meets the threshold for a batch to be complete, at which point a new batch for the identifier is started. Partitioning records based on a data source (e.g., an account identifier) enables the partition of data records from different data sources in a multi-source data stream. For a single source data stream (or in the example of sub-partitioning of records from one source in a multi-source stream), the system may partition data records based on a time stamp associated with one or more records, a session identifier associated with one or more records, and/or a user identifier associated with one or more records.

In another example, batches may also be based (at least in part) on complete user sessions so that a batch includes only entire user sessions that have met a "closing" criteria. This prevents a first portion of a user session being assigned to one batch and a second portion of the user session being assigned to another batch.

Upon the storage of sufficient records in memory to complete one or more batches (e.g., a threshold number of records stored in working memory), the system initiates an analysis to infer a schema for the records of each batch (operation 312). As used herein, a schema refers to field (parameter) types and corresponding value types associated with data records of a batch.

As indicated above, a first schema inferred for a first batch may be different (e.g., different field types, different value types) from a second schema inferred for a second batch. In some examples, different schemas may be inferred for batches with different origins (e.g., different data websites, different data source). In some other examples, different schemas may be inferred for different batches from a common source.

In an illustration of this latter type, a website may provide data records documenting user behaviors during a first period of time and collected as a first batch. As with any of the examples presented herein, the website may collect data and configure the provided data records (e.g., parameters recorded, parameter types) according to its own criteria, and not according to criteria dictated or required by the system. The website may then subsequently provide data records documenting user behaviors during a second period of time different from the first period of time that are collected as a second batch. Even though the records associated with the first batch and the second batch are from a common source, the schemas inferred for the data records in each batch may be different from one another.

Once data has been partitioned into a batch (operation 308) and the schema inference analysis initiated (operation 312), the system identifies fields associated with the data records of a batch (operation 316). In some examples, the data source provides field locations (e.g., as bit offsets in a record) and associated field labels to the system. The data source may provide this information for storage in a profile associated with the data source or as metadata transmitted via a data stream with a data record. In other examples, some fields and corresponding field values may be detected using IP protocol metadata. An illustration of this is using an IP address to determine a geographic location of the data source.

The system may optionally execute various preliminary data preparation operations as an aspect of either initiating per batch analysis (operation 312) or identifying fields in a batch (operation 316). For example, the system may generate a dictionary for each batch in which all values for each field are recorded. An index and an inverted index may also be generated to accompany the dictionary. In another example, data preparation operations also include converting the field values in a batch from "row" orientation to "column" orientation. As described above, this improves storage efficiency and reduces query times by organizing all values for a given parameter in a single column.

In some examples, the values associated with the data records of a batch are received as (or converted to) string type field values before further schema inference operations are executed. The field type for a batch may be updated and stored in the dictionary upon execution of field type and value type inference operations, described below.

The system executes operations to infer the field types and value type (i.e., single or multiple values) associated with one or more batches. In one example, the system determines whether each of the identified fields is associated with values having a single value or multiple values (operation 320). In some examples, multiple values may be presumed for all fields in a record. However, this increases the memory requirements for each field thereby decreasing storage efficiency and increasing computational resources used to analyze and store batches. Because encoding a field as a single value improves both storage and query efficiency, the operation 320 is executed in some embodiments to apply this favorable condition when appropriate.

Inferring whether a field may hold a single value or multiple values may be accomplished using any of a variety of techniques. For example, the system may use various techniques for detecting the presence of a character used to separate values. The presence of a value-separation character indicates multiple values within a field whereas the absence of a value-separation character indicates the field is associated with only a single value. Examples of a value-separating character include, but are not limited to, commas and/or semicolons. In other examples, quotation marks surrounding a value may indicate a single (string) value even if value-separation characters are present within the quotation marks.

Examples of techniques used to detect the presence of a value-separation character include, but are not limited to, a machine learning model trained to recognize the presence of one or more value-separation characters. In one example, a Bayes classifier (e.g., a naïve Bayes classifier) may be applied in the operation 320 to detect the presence of one or more value-separation characters. In another example, regular expression models ("REGEX" or "REGEX Parson") may be used to search for these characters in batches of data records.

Because embodiments described herein infer schema on a batch by batch basis for data partitioned by "account" (e.g., interactive computing resource), the machine learning model is similarly trained using observations corresponding to each individual account. In this way, the system may infer schema accurately according to the nomenclature, terminology, and data patterns idiosyncratic to each account.

In the event that the operation 320 determines that a particular field is associated with a single value, the system infers the field type associated with the field (operation 324). Value types include, but are not limited to, integer values, decimal values, string values, date/time values, identifier (e.g., username) values, among others. The system may use regular expression models, trained machine learning models, or statistically sampling models to infer the field type based on the values associated with the field in the batch of data records. In some cases, field type may vary within a batch of data records. In some examples, the majority field type for a particular field may be applied to the field uniformly within the batch. In other examples, values inconsistent with the majority field type may be presumed to be erroneous and omitted from the analysis.

In the event that the operation 320 determines that a particular field is associated with multiple values, the system infers the multiple types of values associated with the multi-value field (operation 328). The system may use a machine learning model that has been trained to differentiate types based on the values associated with the field. For example, machine learning models may be trained to differentiate between data/time values, numeric values, user identifier values, and/or string values, and associate the corresponding type with the data record field in which the values have been stored.

The system analyzes data records to determine whether any additional fields in the batch are to be analyzed (operation 332). The system executes operations 316 to 328 for other fields in records of the batch.

After assigning field types for fields in a batch, the system indexes the data in the batch (operation 336). Example operations of the indexing process are illustrated in FIG. 4 in an example method 400. For example, data records are converted to the inferred schema by applying the inferred field type(s) and value type(s) to each field in each data record (operation 404). Similarly, values of data records stored in the dictionary are converted from the initial string field type to the type inferred by the execution of the method 300 (operation 408). The dictionary, forward index, and inverted index are also operationally updated with any data generated by execution of the method 300 (operation 412).

The method 300 (and method 400) may be executed for each batch so that changes to field type and value type are recorded by the system in a format that support real-time data processing, storage, and querying.

Batches and their corresponding index data may be transmitted to a data storage system for subsequent querying (operation 340). In some examples, the system performs this operation by transmitted a binary representation of the batch data, its schema, and its associated index data (dictionary, forward index, inverted index).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIG. 5 is a schematic scenario 500 that is provided for convenience of illustration and explanation. A first batch 504 of data records 508, 512, and 516 store various user behaviors identified during a first user session from a "click" stream of data. In this example, the customer "435" has accessed various pages in records 508, 512 ("storefront" and "motherboard deals"). The customer "435" has also added an item ("motherboard") for a price ($50.00) to a cart as shown in record 516.

Because the data records 508, 512, and 516 are provided to the system without a pre-determined schema, the system then executes schema inference operations on the batch 504. The results of the inference operation are illustrated in the inference table 520. The row-oriented data provided in the records 508, 512, 516 are converted to column orientation. As shown, this conversion to column orientation arranges field labels (which can be stored in association with an account profile) vertically in column 524. The values for each field have been omitted for clarity. Field type inferences are shown in column 528. Each of the field types is presumed to hold only a single value, and not multiple values, in the batch inference 520.

A second batch 506 of data records 532, 536, and 540 stores various user behaviors identified during a second user session. In the data record 532, the customer "435" has opened a retargeting campaign email and accessed items for a mouse, a keyboard, and a monitor. In record 536, customer 435 engages and email and in record 540 the customer views a page displaying peripherals. The schema inference 544 of this second batch 506 includes new fields "email" and "campaign" that are underlined in column 548 for convenience of illustration. These new fields were not detected in the data records 508, 512, 516 of the first batch 504. The field type of the "item" field has changed from a single value string type in schema inference 520 to a multi-value string type in schema inference 544. This change in field type reflects the multiple items viewed by the customer via the retargeting email. Furthermore, because the customer did not place any items in a cart, the "price" field, present in the first schema inference 520, does not appear in second schema inference 544.

Thus, the field inferences accommodate changes in data records so as to reflect changes in user behavior without burdening the data source with a complicated and inflexible schema.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a data stream comprising a plurality of data records;
partitioning the plurality of data records into a plurality of batches comprising (a) a first batch of data records and (b) a second batch of data records;
inferring field types for the plurality of data records, received in a same data stream, on a per-batch basis at least by:
processing the first batch of data records received via the stream based on a first inferred set of field types at least by:
identifying a first plurality of fields corresponding to the data records of the first batch, the first plurality of fields comprising a particular field;
analyzing a first set of values, associated with the particular field, in the data records of the first batch to determine the first inferred set of one or more field types corresponding to the particular field for data records of the first batch;
wherein the first inferred set of field types, corresponding to the particular field, comprises a first field type corresponding to a first value for the particular field in a first record and a second field type corresponding to a second value for the particular field in a second record;
indexing the first set of values in association with (a) the particular field and (b) a respective inferred field type of the first inferred set of field types;
processing the second batch of data records received via the stream based on a second inferred set of field types at least by:
identifying a second plurality of fields corresponding to the data records of the second batch, the second plurality of fields comprising the same particular field comprised in the first plurality of fields;
analyzing a second set of values, associated with the particular field, in the data records of the second batch to determine the second inferred set of one or more field types corresponding to the particular field for data records of the second batch,
wherein the first inferred set of one or more field types corresponding to the particular field is different than the second inferred set of one or more field types corresponding to the particular field; and
indexing the second set of values in association with (a) the particular field and (b) a respective inferred field type of the second inferred set of field types.

2. The method of claim 1, wherein:
the second inferred set of field types, corresponding to the particular field, consists of a single field type.

3. The method of claim 1, wherein analyzing the first set of values, associated with the particular field, in the first batch to determine a first inferred set of one or more field types corresponding to the particular field comprises:
detecting at least two values, corresponding to the particular field, in a same data record of the first batch.

4. The method of claim 1, wherein analyzing the first set of values, associated with the particular field, in the first batch to determine a first inferred set of one or more field types corresponding to the particular field comprises:
identifying a number of field types corresponding to the particular field; and
inferring a type of each field type of the number of field types by applying a machine learning model.

5. The method of claim 1, wherein analyzing the first set of values, associated with the particular field, in the first batch to determine a first inferred set of one or more field types corresponding to the particular field comprises:
selecting a value of the first batch using statistical sampling; and
applying regular expression analysis to the value to determine a type of the value.

6. The method of claim 1, wherein further comprising receiving the plurality of data records in a data stream, wherein the plurality of data records are partitioned into the first batch and the second batch concurrent with receipt of additional data records via the data stream.

7. The method of claim 1, further comprising inferring a first schema for the first batch based on the first plurality of fields and a second schema for the second batch based on the second plurality of fields.

8. The method of claim 1, further comprising:
prior to the partitioning operation, receiving the plurality of data records in a single data stream, wherein partitioning particular records of the plurality of data records into the second batch is based on a data record capacity threshold of the first batch being met.

9. The method of claim 1, wherein the plurality of data records are received in a single data stream, wherein the first plurality of fields is identical to the second plurality of fields, and wherein a first set of types corresponding to the first plurality of fields is not identical to a second set of types corresponding to the second plurality of fields.

10. The method of claim 1, wherein:
the method is performed by a data storage system; and
the plurality of data records comprise records that do not comply with any predetermined schema.

11. One or more non-transitory computer-readable media storing instructions, which when executed by one or more hardware processors, cause performance of operations comprising:
receiving a data stream comprising a plurality of data records;
partitioning the plurality of data records into a plurality of batches comprising (a) a first batch of data records and (b) a second batch of data records;
inferring field types for the plurality of data records, received in a same data stream, on a per-batch basis at least by:
processing the first batch of data records received via the stream based on a first inferred set of field types at least by:
identifying a first plurality of fields corresponding to the data records of the first batch, the first plurality of fields comprising a particular field;
analyzing a first set of values, associated with the particular field, in the data records of the first batch to determine the first inferred set of one or more field types corresponding to the particular field data records of the first batch;
wherein the first inferred set of field types, corresponding to the particular field, comprises a first field type corresponding to a first value for the particular field in a first record and a second field type corresponding to a second value for the particular field in a second record;
indexing the first set of values in association with (a) the particular field and (b) a respective inferred field type of the first inferred set of field types;

processing the second batch of data records received via the stream based on a second inferred set of field types at least by:
  identifying a second plurality of fields corresponding to the data records of the second batch, the second plurality of fields comprising the same particular field comprised in the first plurality of fields;
  analyzing a second set of values, associated with the particular field, in the data records of the second batch to determine a second inferred set of one or more field types corresponding to the particular field data records of the second batch,
    wherein the first inferred set of one or more field types corresponding to the particular field is different than the second inferred set of one or more field types corresponding to the particular field; and
  indexing the second set of values in association with (a) the particular field and (b) a respective inferred field type of the second inferred set of field types.

12. The one or more media of claim 11, wherein: the second inferred set of field types, corresponding to the particular field consists of a single field type.

13. The one or more media of claim 11, wherein analyzing the first set of values, associated with the particular field, in the first batch to determine a first inferred set of one or more field types corresponding to the particular field comprises:
  detecting at least two values, corresponding to the particular field, in a same data record of the first batch.

14. The one or more media of claim 11, wherein analyzing the first set of values, associated with the particular field, in the first batch to determine a first inferred set of one or more field types corresponding to the particular field comprises:
  identifying a number of field types corresponding to the particular field; and
  inferring a type of each field type of the number of field types by applying a machine learning model.

15. The one or more media of claim 11, wherein analyzing the first set of values, associated with the particular field, in the first batch to determine a first inferred set of one or more field types corresponding to the particular field comprises:
  selecting a value of the first batch using statistical sampling; and
  applying regular expression analysis to the value to determine a type of the value.

16. The one or more media of claim 11, wherein further comprising receiving the plurality of data records in a data stream, wherein the plurality of data records are partitioned into the first batch and the second batch concurrent with receipt of additional data records via the data stream.

17. The one or more media of claim 11, further comprising inferring a first schema for the first batch based on the first plurality of fields and a second schema for the second batch based on the second plurality of fields.

18. The one or more media of claim 11, further comprising:
  prior to the partitioning operation, receiving the plurality of data records in a single data stream, wherein partitioning particular records of the plurality of data records into the second batch is based on a data record capacity threshold of the first batch being met.

19. The one or more media of claim 11, wherein the plurality of data records are received in a single data stream, wherein the first plurality of fields is identical to the second plurality of fields, and wherein a first set of types corresponding to the first plurality of fields is not identical to a second set of types corresponding to the second plurality of fields.

20. The one or more media of claim 11, wherein:
  the operations are performed by a data storage system; and
  the plurality of data records comprise records that do not comply with any predetermined schema.

21. A system comprising:
  at least one device including a hardware processor;
  the system being configured to perform operations comprising:
    receiving a data stream comprising a plurality of data records;
    partitioning the plurality of data records into a plurality of batches comprising (a) a first batch of data records and (b) a second batch of data records;
    inferring field types for the plurality of data records, received in a same data stream, on a per-batch basis at least by:
      processing the first batch of data records received via the stream based on a first inferred set of field types at least by:
        identifying a first plurality of fields corresponding to the data records of the first batch, the first plurality of fields comprising a particular field;
        analyzing a first set of values, associated with the particular field, in the data records of the first batch to determine the first inferred set of one or more field types corresponding to the particular field data records of the first batch;
          wherein the first inferred set of field types, corresponding to the particular field, comprises a first field type corresponding to a first value for the particular field in a first record and a second field type corresponding to a second value for the particular field in a second record;
        indexing the first set of values in association with (a) the particular field and (b) a respective inferred field type of the first inferred set of field types;
      processing the second batch of data records received via the stream based on a second inferred set of field types at least by:
        identifying a second plurality of fields corresponding to the data records of the second batch, the second plurality of fields comprising the same particular field comprised in the first plurality of fields;
        analyzing a second set of values, associated with the particular field, in the data records of the second batch to determine a second inferred set of one or more field types corresponding to the particular field data records of the second batch,
          wherein the first inferred set of one or more field types corresponding to the particular field is different than the second inferred set of one or more field types corresponding to the particular field; and
        indexing the second set of values in association with (a) the particular field and (b) a respective inferred field type of the second inferred set of field types.

22. The system of claim 21, wherein:
  the second inferred set of field types, corresponding to the particular field consists of a single field type.

23. The system of claim 21, wherein analyzing the first set of values, associated with the particular field, in the first batch to determine a first inferred set of one or more field types corresponding to the particular field comprises:
    detecting at least two values, corresponding to the particular field, in a same data record of the first batch.

24. The system of claim 21, wherein analyzing the first set of values, associated with the particular field, in the first batch to determine a first inferred set of one or more field types corresponding to the particular field comprises:
    identifying a number of field types corresponding to the particular field; and
    inferring a type of each field type of the number of field types by applying a machine learning model.

25. The system of claim 21, wherein analyzing the first set of values, associated with the particular field, in the first batch to determine a first inferred set of one or more field types corresponding to the particular field comprises:
    selecting a value of the first batch using statistical sampling; and
    applying regular expression analysis to the value to determine a type of the value.

26. The system of claim 21, wherein further comprising receiving the plurality of data records in a data stream, wherein the plurality of data records are partitioned into the first batch and the second batch concurrent with receipt of additional data records via the data stream.

27. The system of claim 21, further comprising inferring a first schema for the first batch based on the first plurality of fields and a second schema for the second batch based on the second plurality of fields.

28. The system of claim 21, wherein:
    the plurality of data records comprise records that do not comply with any predetermined schema.

\* \* \* \* \*